UNITED STATES PATENT OFFICE.

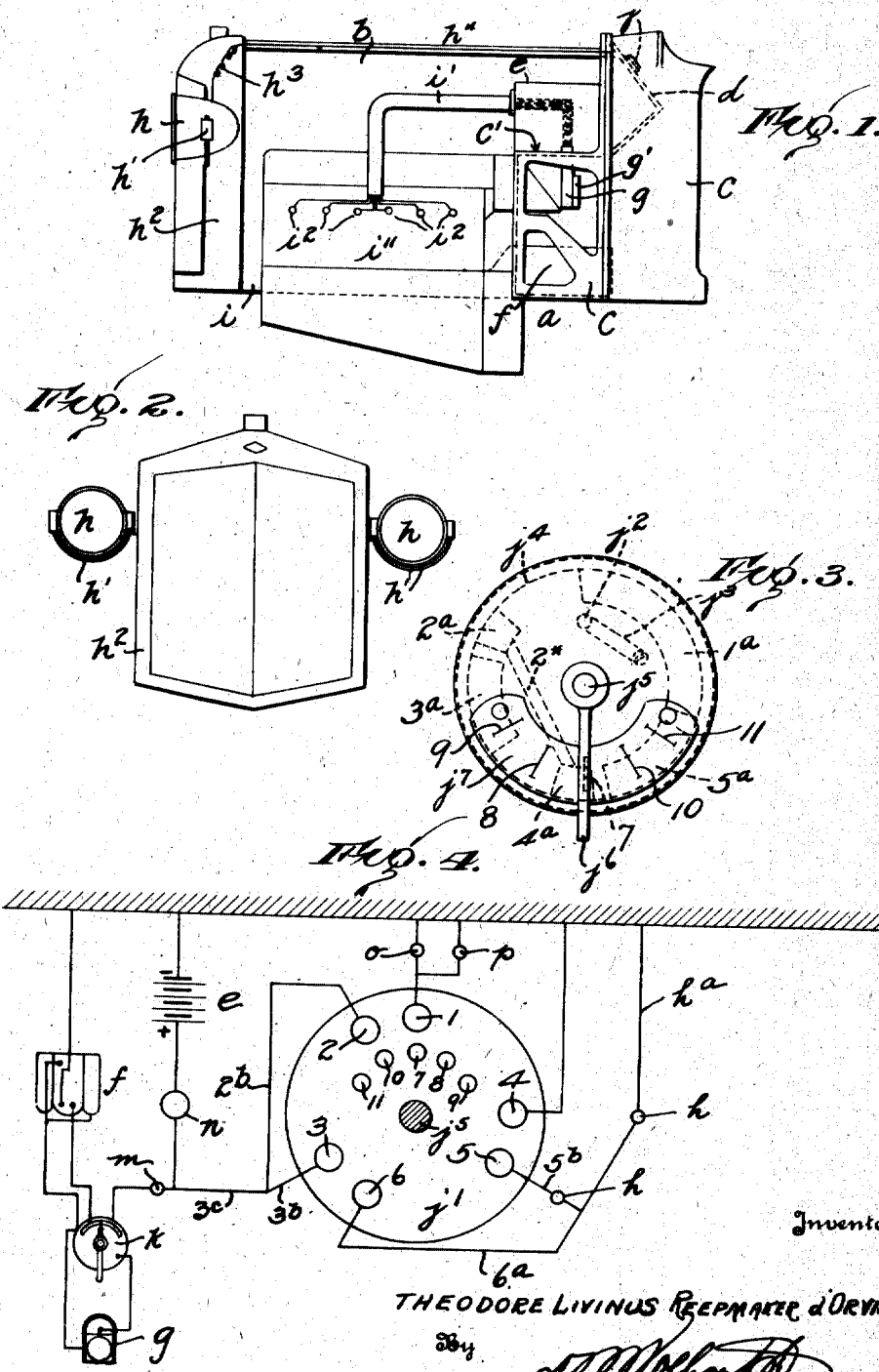

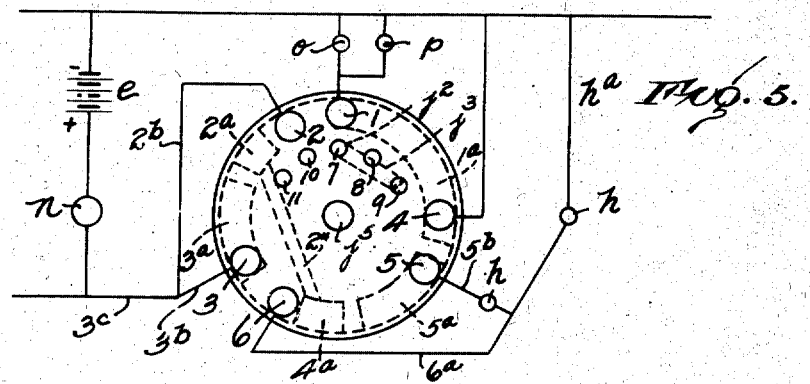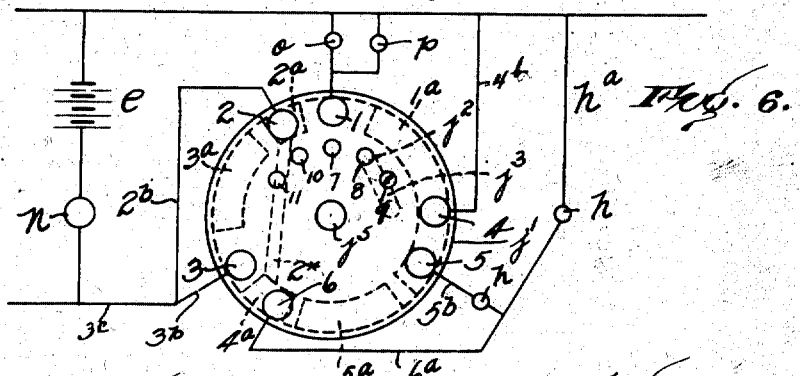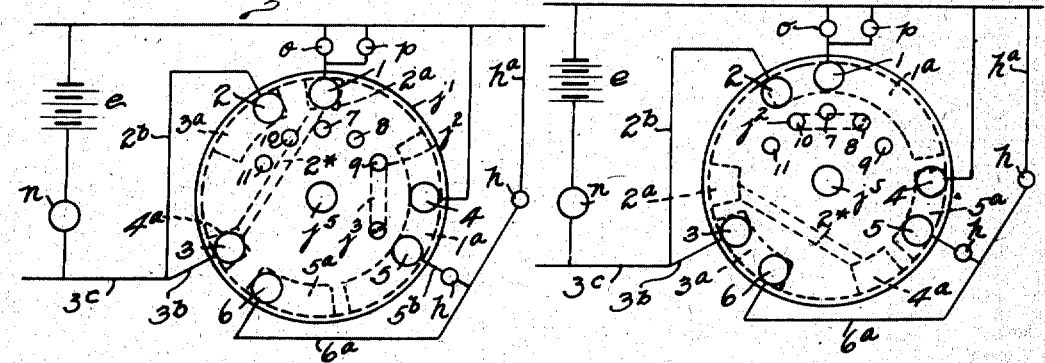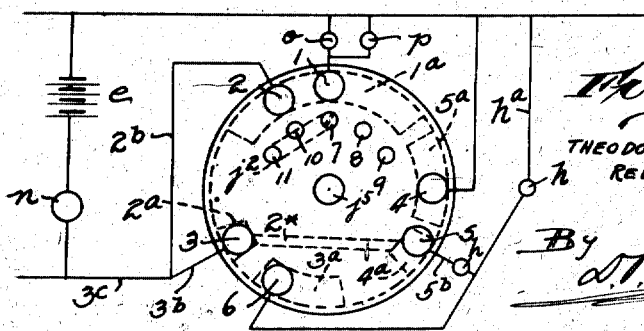

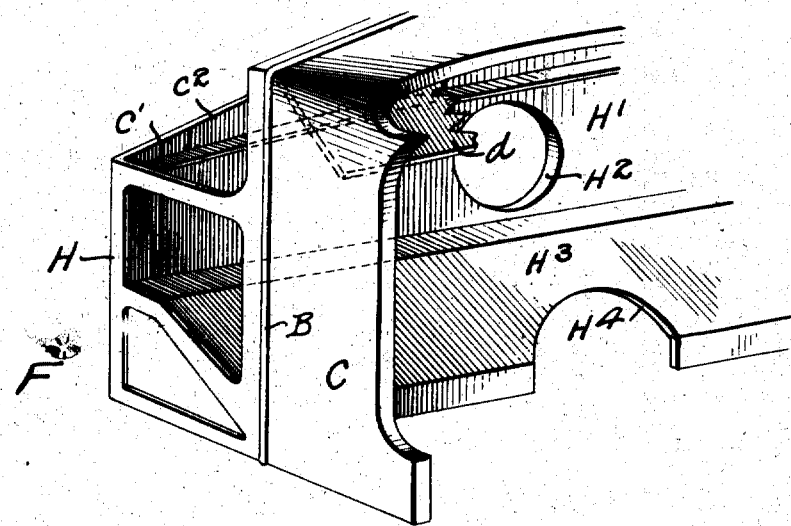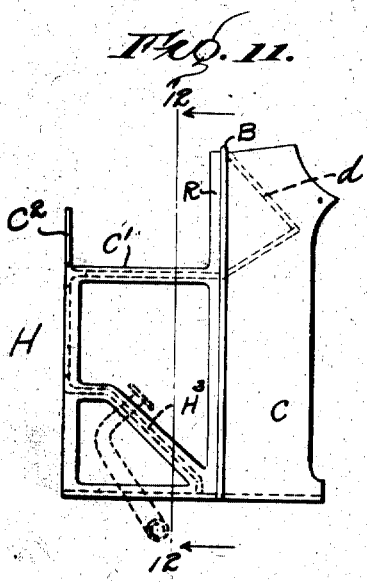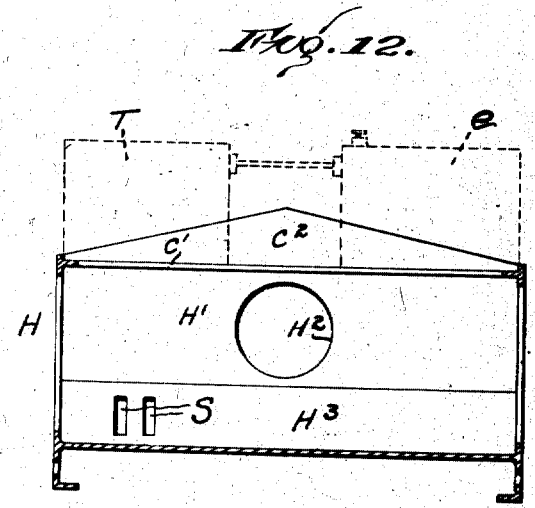

THEODORE LIVINUS REEPMAKER D'ORVILLE, OF FRANKLIN, NEW HAMPSHIRE.

ELECTRICAL EQUIPMENT FOR MOTOR-VEHICLES.

1,279,675.

Specification of Letters Patent. Patented Sept. 24, 1918.

Application filed September 22, 1917. Serial No. 192,778.

*To all whom it may concern:*

Be it known that I, THEODORE LIVINUS REEPMAKER D'ORVILLE, a subject of the Queen of the Netherlands, residing at Franklin, in the county of Merrimack and State of New Hampshire, have invented certain new and useful Improvements in Electrical Equipment for Motor-Vehicles, of which the following is a specification.

This invention relates to motor vehicles and has primarily in view a novel disposition and arrangement of the various electrical devices and apparatus comprised in the electrical equipment thereof. That is to say, the invention has particularly and essentially in view the special location and arrangement of the various electrical units which results in their centralization and consequent reduction in wiring, while at the same time providing for their adequate protection from moisture, dust, and the like, and also generally improving the simplicity and accessibility of the units.

A further object of the invention is to provide a novel type of switch associated with the means for centralizing the various electrical devices, whereby the flow of current from the battery to the various lamps of the vehicle may be readily controlled by the driver of the machine.

The invention is illustrated by the accompanying drawings, in which:—

Figure 1 is a side view showing the general arrangement.

Fig. 2 is a front view showing headlights mounted on radiator cover or casing.

Fig. 3 is a top plan view of the special switch which gives all the variations required for lighting purposes, five variations in all.

Fig. 4 is a plan view of the base member or switch, showing also the wiring in connection therewith.

Figs. 5 to 9 are diagrams showing the various positions of the special switch.

Fig. 10 is a partial perspective view of the dash frame.

Fig. 11 is a side elevation thereof.

Fig. 12 is a cross section on the line 12—12 of Fig. 11.

Similar references designate corresponding parts throughout the several figures of the drawings.

As previously indicated, the present invention has primarily in view the centralization of the various devices of an automobile in a location heretofore unused, thereby not only conserving space but at the same time arranging the several electrical units in a conveniently accessible position, and, because of their proximity, reducing the length of the wiring connections thereby minimizing the possibility of ruptured insulation and consequent short circuits.

Accordingly, with this end in view it is proposed to provide a more or less unitary frame designated generally as F and adapted to be located in the position of the dash as shown in Fig. 1. From Figs. 10, 11 and 12 it will be observed that this frame includes a skeleton like equipment supporting housing H located at the front side thereof and adapted to be concealed within the engine compartment beneath the hood or bonnet $b$ in such a manner that it is open to the ventilating action of the fan while at the same time being protected from rain and the like. The front wall of this part of the frame is provided in its vertical wall $H'$ with an opening $H^2$ for receiving the magneto $g$ while the lower inclined wall $H^3$ is provided with suitable slots S to accommodate the clutch and brake pedals, and also has an arched opening $H^4$ for straddling the generator. This inclined wall $H^3$ also provides a convenient foot board.

The top of the housing H is formed with the ledge $c'$ and also the guard wall $c^2$, and said ledge supports at one side of the housing and beneath the bonnet $b$ the battery box $e$, thus protecting the same from moisture and the like, while giving ready accessibility to said box which heretofore has been located either on the running board, below a seat, or in a trough below the floor board. This location also brings said box in close proximity to the dynamo motor $f$ and magneto $g$ which are mounted in the walls $H^3$ and $H'$ respectively with consequent reduction in wiring. On the other side of the ledge $c'$ there is mounted a tool box, T, so that the same is readily accessible, and for the purpose of holding the tool box and battery box in place they may be clamped together as shown by dotted lines in Fig. 12.

The frame F is provided at its intermediate portion with a bonnet receiving recess R and adjacent bead B, and the portion opposite the housing H is formed with the cowl element c having associated therewith the instrument board d to which are fitted the various electrical indicating and controlling devices such for instance as the novel type of switch to be presently referred to.

The headlights h—Figs. 1 and 2—are mounted in brackets h' attached to the radiator casing $h^2$ and the wires $h^3$ from battery box e to said lights h are carried through a stay tube $h^4$ inside the bonnet b, return from lights being earthed to chassis i in a tube i' which extends from battery box e to engine i'' and conveys the wires from magneto distributer g' to as many sparking plugs $i^2$ as there are cylinders employed.

Referring now to the means for giving the variations required for lighting purposes, there is mounted on the instrument board d associated with the frame F a special switch indicated as a whole by the reference letter j—Fig. 1—said switch j being shown in detail in Figs. 3 and 4.

In the ebonite or other insulating base j' are arranged six contact studs or terminals, 1, 2, 3, 4, 5, 6, and five recesses 7, 8, 9, 10, 11, which recesses 7, 8, 9, 10, 11, are adapted to be engaged by a knob $j^2$ carried by a spring blade $j^3$—Fig. 3—attached to the underside of an ebonite disk $j^4$—Fig. 3—fixed to the spindle $j^5$, to which is secured the operating handle $j^6$, which can be moved to any of the positions 7, 8, 9, 10, 11 marked on the index plate $j^7$ on the cover of the switch, said positions which correspond with the recesses 7, 8, 9, 10, 11 reading:—7 "All off" 8 "Head only", 9 "Tail and dash", 10 "All on bright", 11 "All on, head dim".

On the underside of the disk $j^4$ are five contact strips $1^a$, $2^a$, $3^a$, $4^a$, $5^a$, adapted to contact with the studs 1, 2, 3, 4, 5, 6, in the manner hereinafter described, contact strips $2^a$ and $4^a$ being bridged by strip $2^*$.

Terminal 1 is connected to tail o and dash p and then earthed. Terminals 2 and 3 are connected by leads $2^b$, $3^b$, and $3^c$, to battery and then earthed. Terminal 4 is connected to earth. Terminals 5 and 6 are connected by leads $5^a$ and $6^a$ to headlights h and then earthed.

k is a starting switch connected with dynamo f.

m is an indicator and n a volt-ammeter.

In Fig. 5 is shown the "all out" position 7 corresponding to the position of the combined Figs. 3 and 4.

If now the handle $j^6$ be moved to position 8 on Fig. 3 then there obtains "head only" with circuit, battery e, leads $3^c$, $2^b$, terminal 2, contact strip $2^a$, bridge $2^*$, contact strip $4^a$, terminal 6, leads $6^a$, lamp h, lead $5^b$, strip $1^a$, terminal 5, terminal 4 and lead $4^b$ to earth and also by other lamp and lead $h^a$ to earth as shown in Fig. 6, knob $j^2$ engaging recess 8.

Moving handle $j^6$ to position 9 on Fig. 3 "Tail and dash" now gives circuit, battery e, leads $3^c$, $3^b$, terminal 3, strip $4^a$, bridge $2^*$, terminal 1, strip $2^a$, tail and dash o and p and thence to earth, knob $j^2$ engaging in recess 9, as shown in Fig. 7.

Moving handle $j^6$ now to position 10—Fig. 3—"All on, bright," gives circuit, battery e, leads $3^c$, $2^b$, terminal 2, strip $1^a$, terminal 1 to tail o and dash b, thence to earth and also, by leads $3^c$, $3^b$, terminal 3, strip $3^a$, terminal 6, lead $6^a$ to lamp h, terminal 5, strip $5^a$, terminal 4 to earth, and also to other lamp h and thence to earth by $h^a$, knob $j^2$ engaging recess 10, as in Fig. 8.

Turning the handle $j^2$ now to the position 11 Fig. 3—"All on, head dim" gives circuit, battery e, lead $3^c$, $2^b$ to terminal 2, strip $1^a$, terminal 1, tail o dash p to earth, also lead $3^b$, terminal 3, strip $2^a$, bridge $2^*$, strip $4^a$, terminal 5, lamps h and lead $h^a$ to earth, knob $j^2$ engaging recess 11 as in Fig. 9.

I claim:

1. An automobile electrical system including the battery, magneto, generator, and associated devices, a separate housing adapted to incase and carry all of said instruments and including a cowl portion and an instrument board located within the said cowl portion.

2. An automobile electrical system including the battery, magneto, generator, and associated devices, a separate housing having a front portion arranged within the engine compartment and adapted to support all of said instruments, said housing also having a rearwardly extending cowl portion, and an instrument board associated with the cowl.

3. An automobile electrical system including the battery, magneto, generator, and associated devices, a separate housing having a front portion adapted to support all of said instruments and located within and at one end of the engine compartment, and an instrument board carried by the rear side of the housing.

4. An automobile electrical system including the battery, magneto, generator, and associated devices, a separate skeleton-framing constituting a ventilating housing for supporting and incasing all of said instruments, said framing being located at one end of the engine compartment, and an instrument board associated with the framing.

5. An automobile electrical system including the battery, magneto, generator, and associated devices, a separate housing adapted to incase all of said instruments and located within the engine compartment, and an ignition wire conduit carried by said housing and adapted to lead the ignition wires from the magneto to the motor.

6. An automobile electrical system including the battery, head light, and other lamps, a skeleton-frame located within the engine compartment for supporting the battery, an instrument board associated with the frame, a switch carried by the instrument board and electrical connection with the battery and head lights and said other lamps, and a tube in communication with said instrument board adjacent the switch and extending through the engine compartment for housing the wires leading to said head lights.

7. An automobile electrical system including the battery, lamps, magneto, generator, and associated devices, a separate housing adapted to support said battery, magneto, and generator, an instrument board associated with the housing, and a multi-way switch carried by the instrument board and adapted to close the circuit from said battery to said lamps.

8. An automobile electrical system including the battery and lamps, a frame for supporting the battery within the engine compartment, an instrument board associated with same frame, and a multi-way switch carried by the instrument board and electrically connected with said lamps and said battery.

9. An automobile dash unit including a forwardly extending supporting frame portion projecting into the engine compartment, and a rearwardly extending cowl portion.

10. An automobile dash construction including a skeleton frame portion projecting into the engine compartment and a rearwardly extending cowl portion, a hood seat formed between said frame and cowl portions and an instrument board supported within the cowl.

11. An automobile dash construction including a skeleton frame portion projecting into the engine compartment for supporting the various electrical equipment of the machine and including a rearwardly inclined toe board, and also including a substantially arched cowl portion.

12. An automobile dash construction including in combination with the radiator, a combined dash and cowl construction, and a hollow stay connection between the latter and the radiator for bracing the latter and carrying electrical wires.

In testimony whereof I hereunto affix my signature in the presence of two witnesses.

THEODORE LIVINUS REEPMAKER D'ORVILLE.

Witnesses:
EUGENE W. LEACH,
HOLLIS K. SMITH.